S. GORSUCH.
Seed-Planter.
No. 14,284.
Patented Feb. 19, 1856.
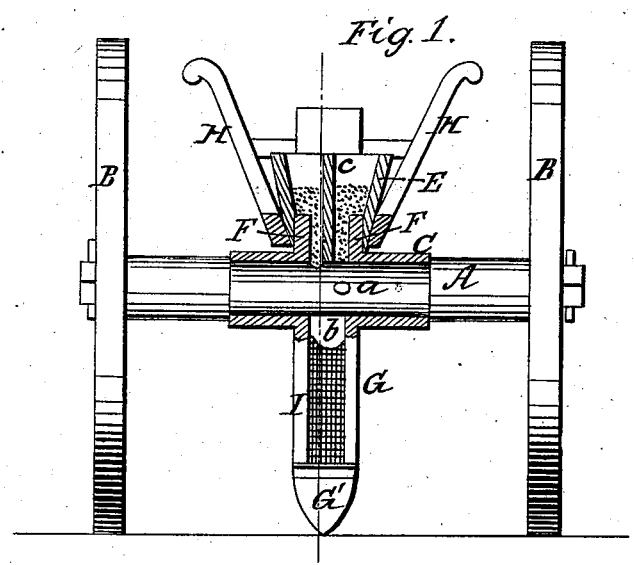
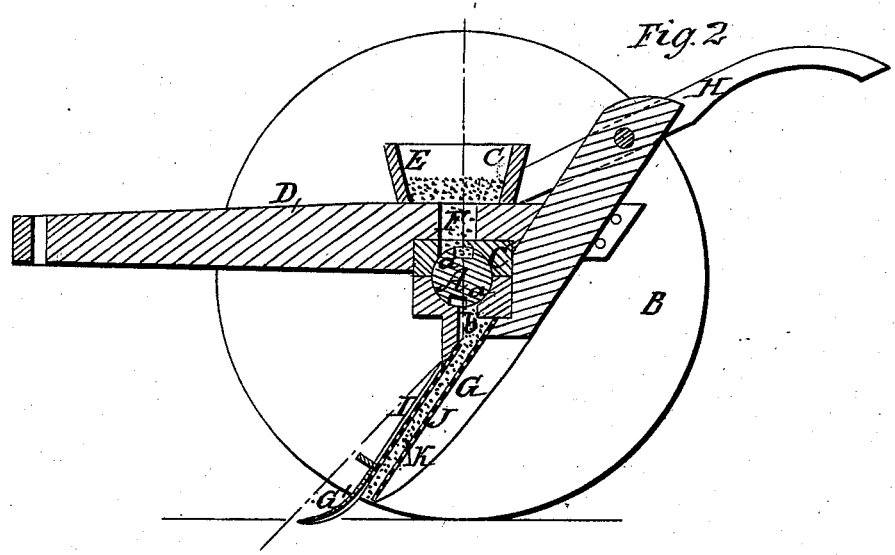

UNITED STATES PATENT OFFICE.

STEPHEN GORSUCH, OF ALTOONA, PENNSYLVANIA.

IMPROVEMENT IN SEEDING-MACHINES.

Specification forming part of Letters Patent No. 14,284, dated February 19, 1856.

*To all whom it may concern:*

Be it known that I, STEPHEN GORSUCH, of Altoona, in the county of Blair and State of Pennsylvania, have invented a new and Improved Seeding-Machine; and I do hereby declare that the following is a full, clear, and exact description of the same, reference being had to the annexed drawings, making a part of this specification, in which—

Figure 1 is a vertical section of my improvement, $x$ $x$, Fig. 2, showing the plane of section. Fig. 2 is a longitudinal vertical section of the same, $y$ $y$, Fig. 1, showing the plane of section.

Similar letters of reference indicate corresponding parts in the two figures.

This invention relates to a new and improved machine for planting seed, commonly termed "seeding-machines."

The invention consists in the peculiar construction of the tube or spout which conveys the seed into the furrow, and to which tube or spout the share is attached.

To enable others skilled in the art to fully understand and construct my invention, I will proceed to describe it.

A represents an axle, to which wheels B B are attached.

C represents a rectangular block, through the center of which the axle A passes longitudinally. The tongue or pole D of the implement is permanently attached to the block C.

E represents a hopper which is attached to the upper surface of the block C. The hopper is placed directly over holes or mortises F, made through the pole D and block C, the holes extending down to the axle A, which has recesses $a$ made in it, the recesses being in line with or directly underneath the holes or mortises F.

G represents a conveying tube or spout, the upper part of which is attached to the back end of the tongue or pole D, and also to the cross-piece of the handles H H of the implement. The tube or spout G communicates with the recesses $a$ in the axle A by means of a passage, $b$, made in the under side of the block C.

The front and back sides of the tube or spout G are open, and the front side is covered by a screen, I. Just back of the screen I a screen, J, is placed, a space, K, being allowed between the two screens, which space is in line with the passage $b$.

To the lower end of the tube or spout G a share, G', is attached.

The hopper E is divided into two compartments by a partition, $c$, the compartments being in line with the holes or mortises F. One compartment contains the seed to be sown and the other may contain plaster, ashes, or other manure.

As the machine is drawn along the seed and manure are carried around by the recesses $a$ in the axle A and deposited in suitable quantities at a time in the tube or spout G, the seed and manure passing down between the two screens I J into the furrow formed by the share G'.

By employing the screens I J the operator or attendent at the handles is enabled to see the seed as it falls into the furrow, and in case of the distributing device becoming choked or clogged it will be detected at once, and the implement may be cleaned or put in order. In ordinary seeding-machines fields are often imperfectly planted in consequence of the distributing device becoming clogged, and as the furrows are generally covered by covering-shares and the conveying tubes or spouts entirely closed at the sides, there are no means of ascertaining whether the seed has been regularly deposited in the furrows or not.

I do not claim the distributing device, for the same plan is well known and in common use; but

What I claim as new, and desire to secure by Letters Patent, is—

Placing the screens I J in the conveying tube or spout G, the front and back sides of the tube or spout being open, substantially as described, for the purpose specified.

STEPHEN GORSUCH.

Witnesses:
  JONATHAN LIAS,
  ISAAC MCDOWELL.